UNITED STATES PATENT OFFICE.

MAXIME HOCQUET, OF PARIS, FRANCE, ASSIGNOR TO HIMSELF AND
PHILLIPPE STROMSDORFER, OF SAME PLACE.

METHOD OF PRODUCING PLASTIC COMPOSITION FROM CORK, &c.

SPECIFICATION forming part of Letters Patent No. 597,283, dated January 11, 1898.

Application filed July 13, 1897. Serial No. 644,433. (No specimens.) Patented in France April 8, 1895, No. 246,475; in England January 22, 1896, No. 1,587, and in Portugal February 20, 1896, No. 2,075.

*To all whom it may concern:*

Be it known that I, MAXIME HOCQUET, of the city of Paris, France, have invented a Method of Producing a Plastic Composition from Cork and other Materials, (for which I have obtained Letters Patent in France, dated April 8, 1895, No. 246,475; in England, dated January 22, 1896, No. 1,587, and in Portugal, dated February 20, 1896, No. 2,075,) of which the following is a full, clear, and exact description.

This invention relates to the production of a new composition or compounds from cork and other material for use as substitutes for wood, paper, leather, felt, ceramic ware, and other substances or for any purposes for which it may be applicable, and has for its object to produce a composition or substance composed of cheap and easily-procured elements, which can be made capable of resisting water, rigid, or resilient, or semiflexible, or otherwise, which will serve as a non-conductor of heat or electrical insulator, and which, moreover, can be turned in a lathe, carved, or otherwise worked or molded into shape, struck or stamped, or otherwise, as desired.

Heretofore cork-waste, as is well known, has been employed in the manufacture of linoleum and in other ways, but my present invention is designed to employ cork, especially cork-waste, for the production of a new compound by a new combination of elements therewith and a special process of treatment.

My present invention is as follows: The cork is first reduced to a granular, pulverulent, or other more or less finely-divided condition, according to the product required, or I may simply employ waste cork-dust already in condition for treatment according to my invention. I take the cork in the condition above described and first treat the same by means of a solution of borax and then dry the same. When it is completely or sufficiently dry, I then treat the mixture with a solution consisting of gelatin, Dutch glue, (in French, colle de Hollande,) glycerin, crystallized sugar, ammonia, and flowers of sulfur in suitable proportions. For instance, this solution or mixture may advantageously consist of the following proportions: gelatin in sheets, forty parts; Dutch glue, twenty-five parts; glycerin, fifteen parts; crystallized sugar, sixteen parts; ammonia, two parts; flowers of sulfur, two parts, or thereabout, and these may advantageously be mixed and prepared in the following or other suitable manner: In a vat or vessel of any suitable description, advantageously heated by any suitable means, (such as a water-jacket or steam-jacket,) I introduce gelatin in sheets, Dutch glue, and glycerin. These substances are triturated or thoroughly mixed under heat, and thereafter, when their temperature has been sufficiently lowered, I then add the mixture of powdered crystallized sugar and ammonia. The whole mass is again vigorously stirred or mixed together, and when ready (for instance, on arriving at a state of ebullition) I add the flowers of sulfur, after which the whole mass is again stirred, mixed, or worked together in any suitable manner or by machinery for the purpose of obtaining perfect homogeneity, or as near thereto as possible. These different elements may be employed in proportions varying, as previously described, according to the results desired to be obtained, and after having been heated and mixed together in the aforesaid manner, as above described, the whole mass is brought to a liquid or plastic condition by the addition of a suitable quantity of tannin and bichromate of potash in solution. The tannin solution may consist of one kilogram of tannin to ten liters of water and the bichromate-of-potash solution about one kilogram of bichromate of potash to fifteen to twenty liters of water, the proportion of these two solutions being varied according to the degree of hardness or otherwise which it is desired to impart to the product. Thus the cork having been previously treated with the borax solution and then dried and treated with this tanno-gelatinous-bichromate solution, as above described, is then submitted to a suitable action—such as a vigorous agitation, kneading, or rolling, &c.—with the object of forcing the added elements to enter the pores or interstices of the cork. When this is finished, the mixture is dried and then reduced to powder, and this powder then put into molds and compressed under heat, or instead thereof this composition may be otherwise molded or formed into the articles or shapes or forms desired in any other desired or suitable manner.

When molding articles from this composition, I may coat the exterior thereof in any suitable manner (for instance, by impregnating the surface at the time of molding) with any suitable powder, such as metallic or mica powder, mother-of-pearl, or other substances capable of being reduced to a powder and adapted to give luminous or other effects to the made article.

I claim—

1. The herein-described method of producing a plastic composition, which consists in treating comminuted material, with a solution of borax, and thereafter with a solution containing gelatin and glycerin, substantially as described.

2. The hereinbefore-described process for the production of a composition or compound from cork and other materials, which consists in treating cork—reduced to a more or less finely-divided condition—with a solution of borax and then drying the same and then mixing with these a solution consisting of gelatin, Dutch glue (in French: "colle de Hollande") glycerin, crystallized sugar, ammonia and flowers of sulfur, the various components being mixed and combined in the proportions and in the manner specified and the composition thus obtained being molded into the articles or forms desired or utilized in the manner and for the purposes hereinbefore set forth.

3. The herein-described method of producing a plastic composition, which consists in treating comminuted material, first with a borax solution, and then with a solution containing gelatin, glycerin, tannin, and bichromate of potash, substantially as described.

4. As a new composition, cork impregnated with borax and a gelatinous substance.

5. As a new composition, cork impregnated with borax, a gelatinous substance, tannin, and bichromate of potash.

The foregoing specification of my "Manufacture of new compounds or composition from cork and other materials for use as substitutes for wood, leather, and other substances or for other purposes to which same may be applicable" signed by me this 18th day of June, 1897.

MAXIME HOCQUET.

Witnesses:
EDWARD P. MACLEAN,
ALBERT MOREAU.